US005189729A

United States Patent [19]

Hancock

[11] Patent Number: 5,189,729

[45] Date of Patent: Feb. 23, 1993

[54] VIDEO OCCLUSION FOR OVERLAPPING STROKE VECTORS

[75] Inventor: William R. Hancock, Phoenix, Ariz.

[73] Assignee: Honeywell Inc., Minneapolis, Minn.

[21] Appl. No.: 541,544

[22] Filed: Jun. 21, 1990

[51] Int. Cl.[5] .................. G06F 15/62

[52] U.S. Cl. .................. 395/135; 395/164; 395/166

[58] Field of Search .................. 395/135, 164, 166; 340/734; 364/728.05; 358/155

[56] References Cited

U.S. PATENT DOCUMENTS

| | | | |
|---|---|---|---|
| 4,631,532 | 12/1986 | Grothe | 340/703 |
| 4,695,965 | 9/1987 | Fujita et al. | 395/135 |
| 4,716,460 | 12/1987 | Benson et al. | 358/140 |
| 4,757,470 | 7/1988 | Bruce et al. | 395/135 |
| 4,847,608 | 7/1989 | Bouron | 340/747 |
| 4,907,086 | 3/1990 | Truong | 340/734 X |
| 4,949,282 | 8/1990 | Muraoka | 364/728.05 |
| 5,016,191 | 5/1991 | Radochonski | 395/166 X |
| 5,034,816 | 7/1991 | Morita et al. | 358/155 X |

*Primary Examiner*—Gary V. Harkcom
*Assistant Examiner*—Mark K. Zimmerman
*Attorney, Agent, or Firm*—Ronald E. Champion; George A. Leone

[57] ABSTRACT

A full field memory based stroke written vector occluder consisting of a first full field memory as the primary occlusion mechanism, and a second full field memory as a quantized error correction occlusion function. The apparatus includes a mechanism for generating the address of the second full field memory from the address of the first full field memory added to the least significant bit of the address plus or minus 1. The apparatus also includes an OR gate to provide the real occlusion function which is the result of accessing either or both of the full field memories.

12 Claims, 3 Drawing Sheets

VIDEO OCCLUSION FOR OVERLAPPING STROKE VECTORS

BACKGROUND OF THE INVENTION

This invention relates to a video occlusion mechanism for overlapping stroke written vectors, and, more particularly, to a video occlusion blanking mechanism using a first full field memory and a second full field memory offset from the first by half a pixel.

Current stroke written displays suffer from overlapping vector distortion causing a number of undesirable effects. On monochromatic displays, for example, an overwriting stroke vector can cause an intensity variation. As another example, on a color display an overlapping stroke vector can cause a color distortion. Two overlapping stroke vectors of different colors can result in a third, undesirable, color being displayed. A mechanism is needed to shut off one of the two intersecting vectors in such cases so that the undesirable effects are eliminated or minimized. The process of dynamically shutting off and then turning on a stroke vector is called occlusion. Occlusion is typically accomplished in a stroke written display by modulating the beam intensity for a period. The beam still traces the stroke vector at the intersection point but its intensity is reduced to a level that does not affect the display.

Prior art systems have utilized a full field memory ("FFM") to accomplish the occlusion function. In a full field memory there is a one-to-one correspondence between each location in memory and an area of contiguous points on the stroke written display. The corresponding area on the display is called a pixel. This one-to-one correspondence is exploited to provide the occlusion function. The FFM is loaded, at the coordinate address of the vector's pixels with an occlusion logical "1" when the vector is drawn. The prior art occlusion works well when an intersecting set of stroke vectors intersect in, or close to a pixel. When the intersection of two stroke vectors occurs at the intersection of four adjacent pixels, however, the full field memory approach of the prior art fails to adequately occlude one of the lines. This problem is called quantization error. Additionally, quantization error results in line width distortion. Full field memory occlusion mechanisms result in occlusion points that are typically smaller in size than the width of the line to be occluded. This results in occlusion that is too small, thus distorting the displayed line. On displays that can present both stroke written information and raster scanned information it may be desirable to occlude the raster signal to the display. Quantization error adversely affects this raster occlusion by not occluding regions at pixel boundaries.

Referring now to FIG. 1A, a schematic diagram explaining the quantization error of two intersecting vectors A and B on a stroke written display with pixels numbered 1, 2, 3 and 4. Vector A is represented by the dotted line and vector B is represented by the line of X's. Vectors A and B intersect at pixel 3. No other pixel shares any part of the intersection. To successfully occlude vector B after vector A has been displayed requires the shutting off of vector B while the display beam is over pixel 3.

In the full field memory approach of the prior art, the x and y coordinates of the vector are used to address the FFM. The FFM provides the occlusion signal directly from memory. In a typical stroke written vector system the vector coordinates are of a higher resolution than the addressability of the FFMs. The most significant bits of the coordinates are used to address the FFMs.

Referring now to FIG. 1B, a schematic diagram of two intersecting vectors C and D on a stroke written display with pixels numbered 1, 2, 3 and 4. Vectors C and D intersect at the common corner point of pixels 1, 2, 3 and 4. Since the vectors have no common intersecting pixel, the FFMs do not contain an occlusion signal at this point. In such cases, the prior art fails to successfully occlude vector D after vector C has been drawn.

Referring now to FIG. 2, a block diagram of a prior art occlusion mechanism utilizing a full field memory having a dimension of $128\times128\times1$ bits is shown. The full field memory is a static random access memory (SRAM) 10 used to store the video occlusion information in a stroke written display. The SRAM 10 has two addresses, the x address 11 and the y address 12. In this example of the prior art the full field memories are addressed with 7 bits. The output of the full field memory, called the occlusion signal 11, is read directly out of the SRAM 10. The occlusion signal 11 indicates to the occlusion electronics when to modulate the stroke writing intensity to a level that will not affect the display. For systems utilizing a color priority scheme more than 1 bit of information may be employed.

Prior art occlusion mechanisms have not dealt with the overlapping stroke vectors at a pixel boundary problem, the line width distortion problem or the raster scanned video problem. The present invention solves all three problems by employing an additional FFM with an offset address to correct the quantization problem.

SUMMARY OF THE INVENTION

It is one object of this invention to provide an occlusion mechanism for the region of a full field memory where quantization error prevents the occlusion of the intersection of two stroke vectors.

It is a further object of the invention to provide an improved line width occlusion mechanism for the intersection of two stroke vectors.

It is yet another object of the invention to provide an occlusion mask for blanking raster background video.

The invention provides a quantization error correction occlusion mechanism, wherein the occlusion mechanism uses a second full field memory to dynamically occlude the intersection points of two vectors. The full field memories are offset from each other by a half pixel change in the address. This allows the second full field memory to provide the proper occlusion signal to the occlusion electronics in the display. The full field memory that is offset is logically "ORed" with the full field memory that is not offset. This results in the proper occlusion for the quantization error but also gives additional resolution to provide a more accurate occlusion mask for the stroke written vectors.

BRIEF DESCRIPTION OF THE DRAWINGS

To illustrate the invention, one embodiment of this invention will be described hereinafter with reference to the accompanying drawings. The preferred embodiment concerns a dual full field memory with offset address attached to the occlusion electronics of a stroke written video display.

DESCRIPTION OF THE PREFERRED EMBODIMENT

It is helpful to explain the features of the invention with reference to a specific example as described herein. It is to be understood that the described example is meant to illustrate and not to so limit the claimed invention.

Figure 1A:
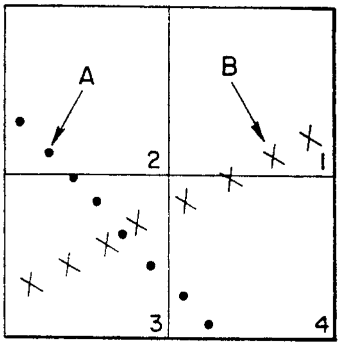
FIG. 1A shows an example of a common overlapping stroke vector problem.
Figure 1B:
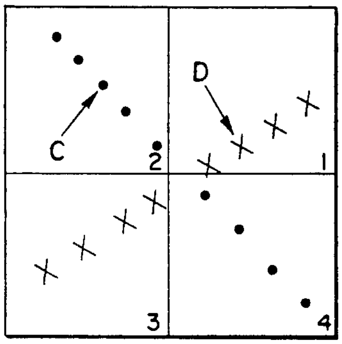
FIG. 1B shows an example of a common overlapping stroke vector quantization error problem.
Figure 2:
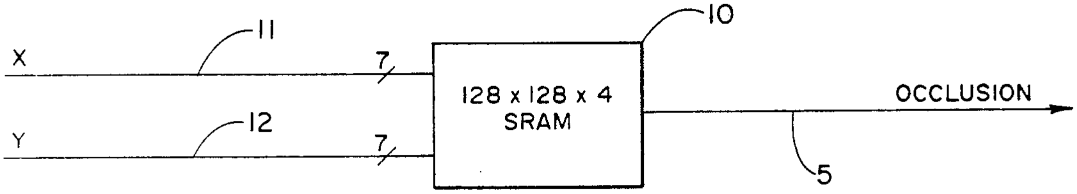
Fig.-2 PRIOR ART
FIG. 2 shows one prior art method of accomplishing occlusion using a full field memory.
Figure 3:
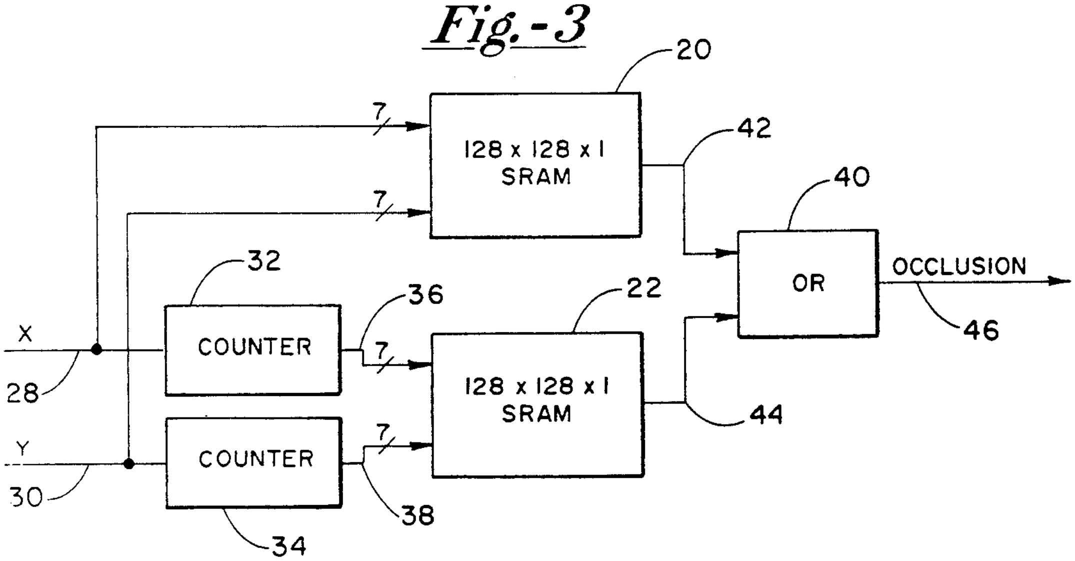
FIG. 3 shows a block diagram of an occlusion apparatus as provided by the invention.

Referring now to FIG. 3, a block diagram of one embodiment of the invention is shown comprising a first static random access memory (SRAM) 20, a second SRAM 22, a first counter 32, a second counter 34, a logical 'or' gate 40, an x address line 28 and a y address line 30 that are, for example, 8 bits wide, a first intermediate occlusion line 42, a second intermediate occlusion line 44 and a primary occlusion line 46.

The x address and y address lines 28, 30 are connected to the x and y coordinate addresses of the stroke vector currently being displayed on a display device which is not shown. The first SRAM 20 has a first input to receive the 7 most significant bits of the x address and a second input to receive the 7 most significant bits of the y address. The first SRAM's output 42 is connected to the first input of the logical 'or' gate 40. The first counter 32 has as an input the full 8 bits of the x address and an output 36 that is either one greater than, one less than or the same as the full x address. The second counter 34 has as an input the full 8 bits of the y address and an output 38 that is one greater than, one less than, or the same as the full y address.

The first input of the second SRAM 22 is connected to the output 36 of the first counter 32. The second SRAM's 22 first input receives the 7 most significant bits of the output of the first counter 32.

The second input of the second SRAM 22 is connected to the output 38 of the second counter. The second SRAM's second input receives the 7 most significant bits of the output 38 of the second counter 34. The output 44 of the second SRAM 22 is connected to the second input 44 of the logical 'or' gate 40. The logical 'or' gate 40 generates the occlusion signal 46. This signal is active when either the first or second or both SRAMs yield an active output. An active output is defined as a logical one.

Both SRAMs 20 and 22 contain the same stroke vector information. The SRAMs may be any suitable commercially available static random access memory devices or equivalent devices as are well known in the art. In this example embodiment of the invention a single bit of occlusion information is being stored in both the first and second SRAMs. Those skilled in the art will appreciate that a plurality of occlusion information including priority information may be stored in the memory devices.

The occlusion function is provided by the offset address generated by the counters at outputs 36 and 38. By adding one, or subtracting one, to both the x and y 8 bit addresses on lines 28 and 30, the 7 most significant bits out of the counters indicate whether the x or y address is at a pixel edge. This is the equivalent of looking ahead, or behind one-half pixel in the x and y directions.

Figure 4:
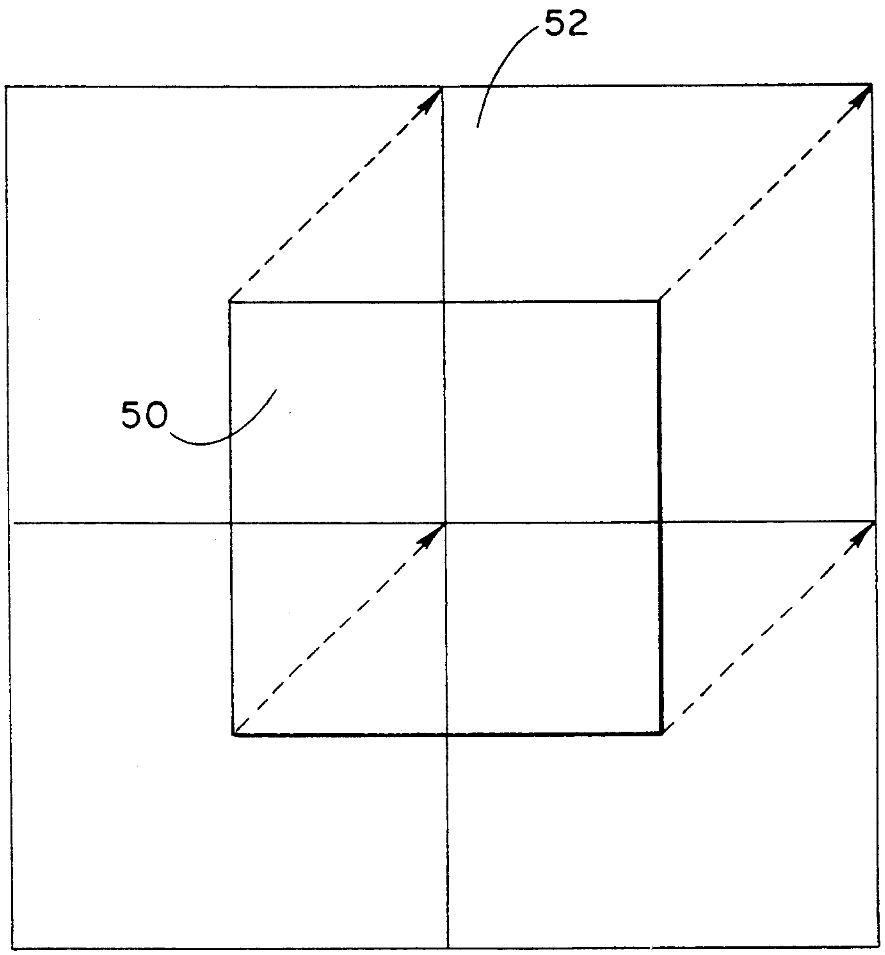
FIG. 4 shows a primary and secondary FFM plane offset from each other.

Referring now to FIG. 4, a schematic representation of the effect of the second full field memory is shown. Pixel 50 is a representative pixel from the first full field memory. After address translation through counters 32 and 34, pixel 52 will be accessed from the second full field memory possibly providing an occlusion signal that pixel 50 did not provide.

Figure 5A:
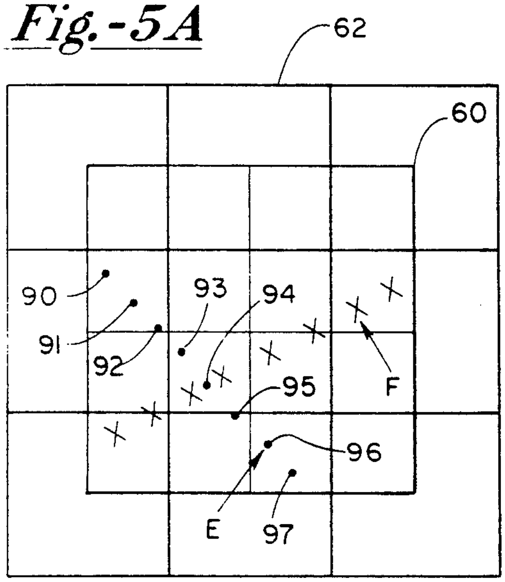
FIGS. 5A, 5B, and 5C show the effect of the invention on examples of three types of stroke written vectors.
Figure 5B:
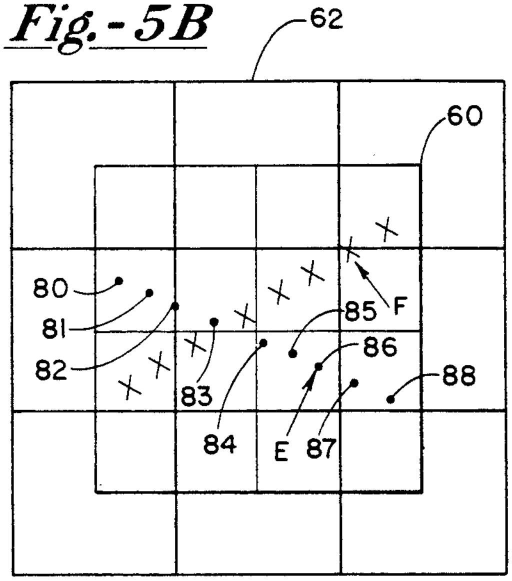
Figure 5C:
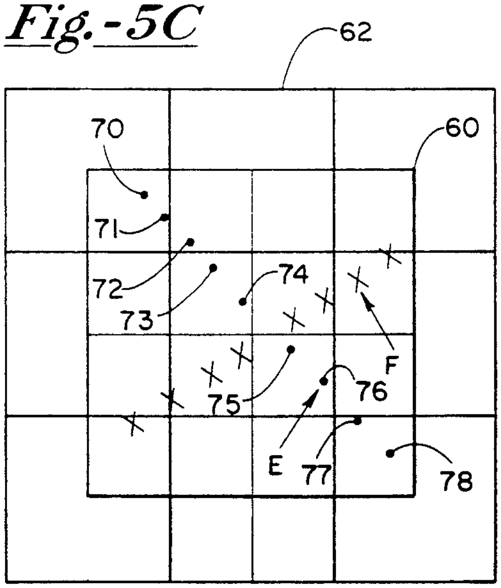

Referring now to FIGS. 5A, 5B and 5C, schematic diagrams of two intersecting vectors E and F utilizing one embodiment of the invention are shown. The first FFM pixel plane 60 provides the normal occlusion function. The translated pixel plane 62 successfully provides the quantized error correction occlusion of the invention.

Referring to FIG. 5A, while writing F after having written E, the first FFM will yield 92, 93, 94 and 95 as occlusion points and the second FFM will yield no additional occlusion points.

Referring to FIG. 5B, while writing F after having written E, the first FFM 60 will yield occlusion for point 84 and the second FFM 62 will yield 82, 83, 84, 85 and 86 as occlusion points.

Referring to FIG. 5C while writing F after having written E, the first FFM 60 will yield no occlusion for all the points (70–78) but the second FFM 62 will yield 72, 73, 74, 75 and 76 as occlusion points.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, the first and second memories can be offset by one-half pixel address during the loading of occlusion information instead of using counters 32 and 34.

What is claimed is:

1. A video occlusion mechanism for two stroke written vectors having vector coordinates provided on an x address line and a y address line comprising:

(a) a first full field memory for storing occlusion signals wherein the occlusion signals are addressed by the vector coordinates and wherein the first field memory means includes a first input connected to the x address line and a second input connected to the y address line, and an output;

(b) a second full field memory for storing the same occlusion signals stored in the first full field memory and including a first input, a second input and an output;

(c) a first counted having an input connected to the x address line and having an output providing a first address and connected to the first input of the second full field memory wherein the first address at its output is unequal to the vector coordinate at its input;

(d) a second counter having an input connected to the y address line and having an output providing a second address and connected to the second input of the second full field memory wherein the second address at its output is unequal to the vector coordinate at its input; and (e) a logical OR gate having a first input connected to the output of the first full field memory and a second input connected to the output of the second full field memory and having an output which provides an ORed occlusion signal.

2. The apparatus of claim 1 wherein the full field memories have a size of at least 32×32×1 bits.

3. The apparatus of claim 1 wherein the full field memories are addressed by at least 5 bits.

4. The apparatus of claim 1 where the first counter is comprised of an add one counter.

5. The apparatus of claim 1 wherein the second counter is comprised of an add one counter.

6. The apparatus of claim 1 wherein the first and second counters are comprised of subtract one counters.

7. A video occlusion mechanism for multiple stroke written vectors having vector coordinates provided on an x address line and a y address line, comprising:

(a) a first memory means for storing occlusion signals wherein the occlusion signals are addressed by the vector coordinates, and wherein the first memory means includes a first input connected to the x address line, a second input connected to the y address line, and an output;

(b) a second memory means for storing the same occlusion signals stored in the first memory means and including a first input, a second input and an output;

(c) a first means for counting having an input connected to the x address line and having an output providing a first address and connected to the first input of the second memory means wherein the first address at its output is unequal to the vector coordinate at its input;

(d) a second means for counting having an input connected to the y address line and having an output providing a second address and connected to the second input of the second memory means wherein the second address at its output is unequal to the vector coordinate at its input; and (e) a logic means for OR gating the outputs of the first and second memory means so as to provide an ORed occlusion signal.

8. The apparatus of claim 7 wherein the first and second memory means have a size of at least 32×32×1 bits.

9. The apparatus of claim 7 wherein the first and second memory means are addressed by at least 5 bits.

10. The apparatus of claim 7 wherein the first counting means is comprised of an add one counter.

11. The apparatus of claim 10 wherein the second counting means is comprised of an add one counter.

12. The apparatus of claim 7 wherein the first and second counting means are comprised of subtract one counters.

* * * * *